US012781108B2

(12) United States Patent
Dollase et al.

(10) Patent No.: US 12,781,108 B2
(45) Date of Patent: Nov. 3, 2026

(54) FOAMED ADHESIVE MASS LAYER AND ADHESIVE TAPE COMPRISING THE FOAMED ADHESIVE MASS LAYER

(71) Applicant: TESA SE, Norderstedt (DE)

(72) Inventors: Thilo Dollase, Hamburg (DE); Michael Egger, Hamburg (DE); Aranzazu Escudero Vallejo, Hamburg (DE); Jessika Gargiulo, Hamburg (DE)

(73) Assignee: TESA SE, Norderstedt (DE)

( * ) Notice: Subject to any disclaimer, the term of this patent is extended or adjusted under 35 U.S.C. 154(b) by 1153 days.

(21) Appl. No.: 17/773,680

(22) PCT Filed: Nov. 3, 2020

(86) PCT No.: PCT/EP2020/080777

§ 371 (c)(1), (2) Date: May 2, 2022

(87) PCT Pub. No.: WO2021/089523

PCT Pub. Date: May 14, 2021

(65) Prior Publication Data

US 2022/0380641 A1 Dec. 1, 2022

(30) Foreign Application Priority Data

Nov. 4, 2019 (DE) ..................... 10 2019 216 938.4

(51) Int. Cl.

*C09J 153/02* (2006.01)
*C08J 9/32* (2006.01)

(Continued)

(52) U.S. Cl.

CPC ............... *C09J 153/02* (2013.01); *C08J 9/32* (2013.01); *C09J 7/387* (2018.01); *C09J 193/04* (2013.01);

(Continued)

(58) Field of Classification Search

CPC ........ C09J 153/02; C09J 7/387; C09J 193/04; C09J 2301/124; C09J 2301/302;

(Continued)

(56) References Cited

U.S. PATENT DOCUMENTS 6,129,983 A 10/2000 Schümann et al.
2003/0113533 A1 6/2003 Husemann et al.

(Continued)

FOREIGN PATENT DOCUMENTS

CA 2 709 713 A1 7/2009
CN 101970556 A 2/2011

(Continued)

OTHER PUBLICATIONS

German Search Report, issued in Priority Application No. 10 2019 216 938.4, dated May 6, 2020.

(Continued)

*Primary Examiner* — Scott R. Walshon
(74) *Attorney, Agent, or Firm* — Birch, Stewart, Kolasch & Birch, LLP

(57) ABSTRACT

A foamed adhesive mass layer includes a) 41.7 to 62.0 wt. % of an elastomer component, b) 37.7 to 58.0 wt. % of an adhesive resin component, c) 0 to 15 wt. % of a soft resin component, d) 0 to 18 wt. % further additives, and e) microballoons with a proportion of preferably 0.3 to 2.5 wt. %, preferably 0.5 to 2.0 wt. % and particularly preferably 0.7 to 1.7 wt. %, wherein the microballoons are at least partially expanded, wherein the elastomer component (a) consists of up to at least 90 wt. % polyvinyl aromatic compound polydine block copolymer, wherein the adhesive resin component (b) contains up to 4 to 100 wt. % of at least one type K1 if a rosin oligomer with a softening temperature (Ring &

(Continued)

Ball, Test VI) of at least 90° C., and wherein the density (Text IX) of the foamed adhesive mass layer is at least 600 $kg/m^3$ and max. 920 $kg/m^3$.

18 Claims, 1 Drawing Sheet

(51) Int. Cl.
*C09J 7/38* (2018.01)
*C09J 193/04* (2006.01)

(52) U.S. Cl.
CPC .... *C09J 2301/124* (2020.08); *C09J 2301/302* (2020.08); *C09J 2301/308* (2020.08); *C09J 2400/24* (2013.01); *C09J 2453/00* (2013.01); *C09J 2493/00* (2013.01)

(58) Field of Classification Search
CPC .............. C09J 2301/308; C09J 2400/24; C09J 2453/00; C09J 2493/00; C09J 2301/412; C09J 7/10; C08J 9/32; C08L 53/02; C08L 91/00; C08L 2203/14; C08L 2203/206; C08L 2205/20
See application file for complete search history.

(56) References Cited

U.S. PATENT DOCUMENTS

| | | | |
|---|---|---|---|
| 2009/0181250 A1 | 7/2009 | Zmarsly et al. | |
| 2011/0120616 A1 | 5/2011 | Zmarsly et al. | |
| 2013/0108408 A1 | 5/2013 | Saison et al. | |
| 2015/0337177 A1 | 11/2015 | Krawinkel et al. | |
| 2018/0079937 A1* | 3/2018 | Blazejewski | B29C 48/765 |
| 2018/0163092 A1 | 6/2018 | Blazejewski et al. | |
| 2019/0040285 A1 | 2/2019 | Dollase et al. | |
| 2019/0211233 A1* | 7/2019 | Bieber | C09J 153/025 |
| 2020/0325362 A1 | 10/2020 | Burmeister et al. | |

FOREIGN PATENT DOCUMENTS

| | | | | |
|---|---|---|---|---|
| CN | 108611018 A | 10/2018 | | |
| DE | 3331016 A1 | 10/1984 | | |
| DE | 10 2008 004 388 A1 | 7/2009 | | |
| DE | 10 2008 056 980 A1 | 5/2010 | | |
| DE | 10 2012 223 670 A1 | 6/2014 | | |
| DE | 10 2016 202 018 A1 | 8/2017 | | |
| DE | 10 2016 209 707 A1 | 12/2017 | | |
| EP | 0 894 841 B1 | 5/2003 | | |
| EP | 1 308 492 B1 | 9/2005 | | |
| EP | 3 075 775 A1 | 10/2016 | | |
| KR | 10-2011-0084371 A | 7/2011 | | |
| KR | 10-2019-0012230 A | 2/2019 | | |
| WO | WO 2009/114683 A1 | 9/2009 | | |
| WO | WO 2010/077541 A1 | 7/2010 | | |
| WO | WO 2010/078396 A2 | 7/2010 | | |
| WO | WO 2011/124782 A1 | 10/2011 | | |
| WO | WO-2016156305 A1 * | 10/2016 | | C09J 11/04 |

OTHER PUBLICATIONS

International Search Report, issued in PCT/EP2020/080777, dated Jan. 12, 2021.
Written Opinion of the International Searching Authority, issued in PCT/EP2020/080777, dated Jan. 12, 2021.
Donker, "The Chemistry of Tackifying Resins," 2001, pp. 149-164.
Satas, "Handbook of Pressure Sensitive Adhesive Technology," Satas & Associates, Warwick, 1999, pp. 346-397 (28 pages total).

* cited by examiner

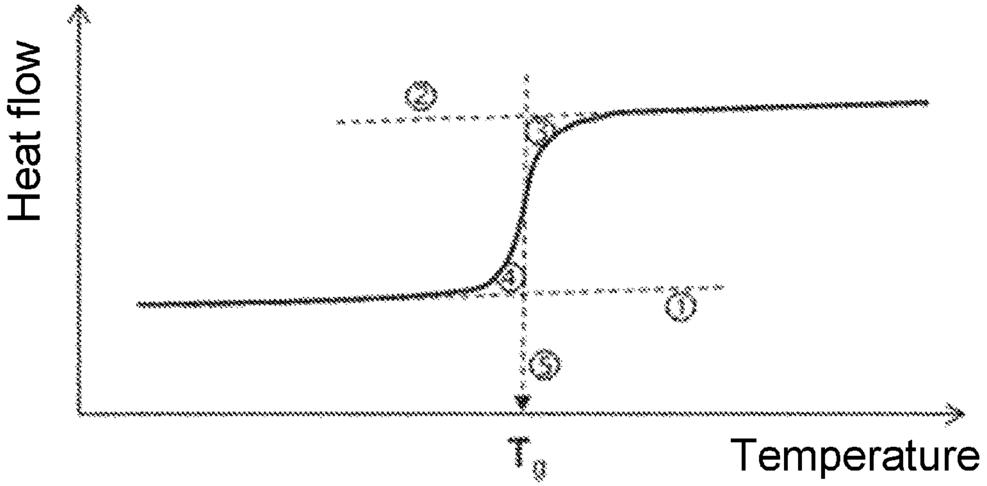
Heat flow
Temperature
$T_g$

FOAMED ADHESIVE MASS LAYER AND ADHESIVE TAPE COMPRISING THE FOAMED ADHESIVE MASS LAYER

BACKGROUND OF THE INVENTION

1. Field of the Invention

The invention relates to foamable pressure-sensitive adhesives, to foamed pressure-sensitive adhesive layers, to self-adhesive products comprising them, such as especially adhesive tapes, and to the use of double-sidedly bonding variants of the adhesive tapes in an assembly with two substrates such as components of mobile devices.

2. Description of Related Art

Synthetic rubber-based pressure-sensitive adhesives which comprise styrene block copolymers are well known and are employed in diverse applications. Advantages of this kind of pressure-sensitive adhesives are the high bond strength on substrates with different surface energy, and in particular on substrates with low surface energy as well. They are notable at the same time for very high holding powers under customary ambient conditions.

Modern-day applications in the field of the bonding of components in mobile devices, which can be generated by self-adhesive products, require not only a combination of high bond strength and holding power but also a high thermal shear strength and shock resistance. Here, for typical synthetic rubber-based formulations, there is a permanent desire for further performance improvement, despite their existing ability to offer attractive performance capacity. High bond strengths are typically achieved by admixing a synthetic rubber with a relatively high fraction of one or more tackifier resins.

The term "mobile devices" embraces, for example, devices of the consumer electronics industry, including electronic, optical and precision devices, and in the context of this application, more particularly those devices as classified in Class 9 of the International Classification of Goods and Services for the Registration of Marks (Nice classification); 10th edition (NCL (10-2013)), to the extent that these are electronic, optical or precision devices, and also clocks and chronometers of Class 14 (NCL (10-2013)), such as, in particular,

- scientific, marine, surveying, photographic, film, optical, weighing, measuring, signaling, monitoring, rescuing, and instruction apparatus and instruments;
- apparatus and instruments for conducting, switching, converting, storing, regulating and monitoring electricity;
- image recording, processing, transmission, and reproduction devices, such as televisions and the like;
- acoustic recording, processing, transmission, and reproduction devices, such as broadcasting devices and the like;
- computers, calculating instruments and data-processing devices, mathematical devices and instruments, computer accessories, office instruments—for example, printers, faxes, copiers, typewriters-, data-storage devices;
- telecommunications devices and multifunction devices with a telecommunications function, such as telephones and answering machines;
- chemical and physical measuring devices, control devices, and instruments, such as battery chargers, multimeters, lamps, and tachometers;
- nautical devices and instruments;
- optical devices and instruments;
- medical devices and instruments and those for sportspeople;
- clocks and chronometers;
- solar cell modules, such as electrochemical dye solar cells, organic solar cells, and thin-film cells;
- fire-extinguishing equipment.

Technical development is going increasingly in the direction of devices which are ever smaller and lighter in design, allowing them to be carried at all times by their owner, and usually being generally carried. This is accomplished typically by realization of low weights and/or suitable size of such devices. Such devices are also referred to as mobile devices or portable devices for the purposes of this specification. In this development trend, precision and optical devices are increasingly being provided (also) with electronic components, thereby raising the possibilities for minimization. On account of the carrying of the mobile devices, they are subject to increased loads—in particular, to mechanical loads—as for instance by impact on edges, by being dropped, by contact with other hard objects in a bag, or else simply by the permanent motion involved in being carried per se. Mobile devices, however, are also subject to a greater extent to loads due to moisture exposure, temperature influences, and the like, than those "immobile" devices which are usually installed in interiors and which move little or not at all.

For these devices, a particular requirement is for adhesive tapes having high holding performance. In some cases there is the desire, additionally, for the possibility of later removal. In many applications, moreover, high strength, including at elevated temperatures, is a requirement.

It is especially important, however, in addition, that the holding power of the adhesive tapes does not fail if the mobile device, for example a cell phone, is dropped and hits the ground. The adhesive strip or bonded assembly must therefore have very high shock resistance.

Pressure-sensitive adhesives (PSAs) based on styrene block copolymers are among the conventional families of adhesive which are employed in self-adhesive products. A series of technological aspects relating to such PSAs are described for example in D. Satas (F. C. Jagisch, J. M. Tancrede in Handbook of Pressure Sensitive Adhesive Technology, D. Satas (ed.), 3rd edn., 1999, Satas & Associates, Warwick, Rhode Island, chapter 16).

For polydienes to be endowed with a tacky character, they must be admixed with tackifier resins. This is also true of vinylaromatic block copolymers which contain polydiene blocks. D. Satas proposes a series of commonplace tackifier resins which can be used for this purpose, and gives guidelines on the selection of suitable tackifier resins for different classes of vinylaromatic block copolymers (F. C. Jagisch, J. M. Tancrede in Handbook of Pressure Sensitive Adhesive Technology, D. Satas (ed.), 3rd edn., 1999, Satas & Associates, Warwick, Rhode Island, chapter 16).

Likewise described are PSAs based on vinylaromatic block copolymers which exhibit advantageous shock resistance. DE 10 2016 202 018 A1 teaches the possibility of achieving improved shock resistance through the selection of suitable block copolymers. It is possible, furthermore, to improve shock resistance if the PSA is in foamed form and for that purpose comprises, for example, expanded microballoons.

EP 3 075 775 A1 describes foamed block copolymer blends with tackifier resins or tackifier resin combinations. Additionally to hydrocarbon resins and polyterpene resins it is possible to use oxygen-containing tackifier resins, which, however, are not specified further.

DE 10 2008 056 980 A1 and DE 10 2008 004 388 A1 teach formulations which are made tacky using tackifier resins, and disclose a formulation which comprises inter alia a polystyrene-polyisoprene block copolymer and, for example, a rosin ester. The adhesives include a relatively high proportion of microballoons, leading correspondingly to very low densities.

The constant object continues to be that of creating further-improved solutions, especially for use in thin double-sided self-adhesive products, for foamed PSA layers which with a high bond strength (peel adhesion) exhibit a high thermal shear strength and in particular improved shock resistance (anti-smash toughness). Such PSA layers would be particularly suitable for self-adhesive products, enabling bonded assemblies particularly in mobile devices with high shock resistance. In addition, the intention is to provide a foamable pressure-sensitive adhesive which can be supplied by foaming a foamed pressure-sensitive adhesive layer as described above.

BRIEF SUMMARY OF THE INVENTION

The invention relates accordingly to a foamable pressure-sensitive adhesive, especially for double-sided self-adhesive tapes, comprising a) 41.7 wt % to 62.0 wt % of an elastomer component,
b) 37.7 wt % to 58.0 wt % of a tackifier resin component,
c) 0 wt % to 15 wt % of a plasticizer resin component,
d) 0 wt % to 18 wt % of further additives and
e) expandable, i.e. in particular unexpanded, microballoons having a fraction of preferably 0.3 wt % to 2.5 wt %, more preferably 0.5 wt % to 2.0 wt % and very preferably 0.7 wt % to 1.7 wt %, where the elastomer component (a) consists at least 90 wt % of polyvinylaromatic-polydiene block copolymers, and where the tackifier resin component (b) comprises 4 wt % to 100 wt % (based on the tackifier resin component), of at least one variety K1 of a rosin oligomer having a softening temperature (ring & ball, test VI) of at least 90° C.

In addition, the invention relates to a foamed pressure-sensitive adhesive layer, especially for double-sided self-adhesive tapes, comprising a) 41.7 wt % to 62.0 wt % of an elastomer component,
b) 37.7 wt % to 58.0 wt % of a tackifier resin component,
c) 0 wt % to 15 wt % of a plasticizer resin component,
d) 0 wt % to 18 wt % of further additives and
e) microballoons having a fraction of preferably 0.3 wt % to 2.5 wt %, more preferably 0.5 wt % to 2.0 wt % and very preferably 0.7 wt % to 1.7 wt %, where the microballoons are in an at least partially expanded state, where the elastomer component (a) consists at least 90 wt % of polyvinylaromatic-polydiene block copolymer, where the tackifier resin component (b) comprises 4 wt % to 100 wt % (based on the tackifier resin component) of at least one variety K1 of a rosin oligomer having a softening temperature (ring & ball, test VI) of at least 90° C., and where the density (test IX) of the foamed pressure-sensitive adhesive layer is at least 600 kg/m$^3$ and at most 920 kg/m$^3$.

Preferred embodiments of the foamable pressure-sensitive adhesive or of the foamed pressure-sensitive adhesive layer are found in the dependent claims.

The further claims relate to adhesive tapes, more particularly double-sided adhesive tapes, comprising at least one pressure-sensitive adhesive layer of the invention, to assemblies wherein two substrates are bonded by means of such an adhesive tape, and to the use of such an adhesive tape for bonding components of mobile devices, such as rechargeable batteries.

BRIEF DESCRIPTION OF THE DRAWINGS

FIG. 1 is a graph of heat flow versus temperature to illustrate how to determine the glass transition temperature of polymer blocks in block copolymers.

DETAILED DESCRIPTION OF THE INVENTION

In the invention a component may be a single chemical compound or a single material or else a mixture of two or more chemical compounds and/or materials.

A pressure-sensitive adhesive (PSA) is an adhesive which even under relatively weak contact pressure allows a permanent bond to virtually all substrates and which optionally after use may be redetached from the substrate substantially without residue. A pressure-sensitive adhesive has permanent pressure-sensitive adhesion at room temperature, i.e. has a sufficiently low viscosity and high touch-tackiness, such that it wets the surface of the respective adhesive substrate even at low contact pressure. The bondability of the adhesive is based on its adhesive properties, and the redetachability is based on its cohesive properties. In accordance with the invention the terms "pressure-sensitive adhesive" and "self-adhesive" (and terms derived from these) are used synonymously.

Foamed PSA layers of the invention feature improved shock resistance in comparison to a reference PSA layer which in the tackifier resin component contains no fraction of rosin oligomer in accordance with the invention, but which is otherwise the same in respect of composition, degree of foaming and construction of the self-adhesive tape specimen. The shock resistance is improved preferably by more than 10%, very preferably by more than 20%.

PSA layers of the invention are particularly attractive if, from the following catalog of requirements, they fulfill the listed criteria for bond strength and shock resistance. Pressure-sensitive adhesive layers of the invention preferably fulfill all three criteria in the catalog of requirements as described in table 1 below:

TABLE 1

Catalog of requirements

| Requirement | Property | Performance | Test method |
|---|---|---|---|
| Bond strength | Peel adhesion (steel) | ≥5.0 N/cm, preferably ≥6.5 N/cm, very preferably ≥8.0 N/cm | Test I |
| Thermal shear strength | SAFT | ≥80° C., preferably ≥100° C., very preferably ≥120° C. | Test II |
| Shock resistance | DuPont z (PC/PC) | ≥600 mJ, preferably ≥650 mJ, very preferably ≥700 mJ | Test III |

Elastomer Component (a)

The elastomer component (a) consists at least 90 wt %, such as for example substantially, of polyvinylaromatic-polydiene block copolymer.

The elastomer component typically comprises at least one synthetic rubber in the form of a block copolymer having an A-B-A, (A-B) n, (A-B) nX or $(A-B-A)_nX$ construction, in which

- the A blocks are independently a polymer formed by polymerization of at least one vinylaromatic,
- the B blocks are independently a polymer formed by polymerization of conjugated dienes having 4 to 18 carbon atoms,
- X is the radical of a coupling reagent or polyfunctional initiator and
- n is an integer ≥2.

In one embodiment, all synthetic rubbers of the PSA (layer) of the invention may be block copolymers having a construction as detailed above. The PSA (layer) of the invention may thus also comprise mixtures of various block copolymers having a construction as above.

The at least one suitable block copolymer hence typically comprises one or more rubberlike blocks B (soft blocks) and at least two glasslike blocks A (hard blocks). More preferably, at least one synthetic rubber of the foamable PSA or foamed PSA layer of the invention is a block copolymer having an A-B-A, $(A-B)_2X$, $(A-B)_3X$ or $(A-B)_4X$ construction, where the above meanings are applicable to A, B and X. It is possible for all the synthetic rubbers of the PSA (layer) of the invention to be block copolymers having an A-B-A, $(A-B)_2X$, $(A-B)_3X$ or $(A-B)_4X$ construction, where the above meanings are applicable to A, B and X. The elastomer component may also comprise one or more diblock copolymers A-B. More particularly, the synthetic rubber in the pressure-sensitive adhesive (layer) of the invention is a mixture of block copolymers having an A-B, A-B-A, $(A-B)_3X$ or $(A-B)_4X$ construction, preferably comprising at least diblock copolymers A-B and/or triblock copolymers A-B-A.

Also advantageous is a mixture of diblock and triblock copolymers and $(A-B)_n$ or $(A-B)_nX$ block copolymers with n not less than 3.

The pressure-sensitive adhesives or pressure-sensitive adhesive layers employed are typically those based on block copolymers comprising polymer blocks predominantly formed from vinylaromatics (A blocks), preferably styrene, and those predominantly formed by polymerization of 1,3-dienes (B blocks), for example butadiene and isoprene or a copolymer of these.

The block copolymers of the pressure-sensitive adhesives or pressure-sensitive adhesive layers preferably have polystyrene end blocks.

The block copolymers that result from the A and B blocks may contain identical or different B blocks. The block copolymers may therefore have linear A-B-A structures. It is likewise possible correspondingly to use block copolymers of radial architecture, and also star-shaped and linear multiblock copolymers.

Instead of the preferred polystyrene blocks, it is also possible as vinylaromatics to utilize polymer blocks based on other aromatic-containing homopolymers and copolymers (preferably $C_8$ to $C_{12}$ aromatics) having glass transition temperatures in accordance with test IV of greater than 75° C., such as α-methylstyrene-containing aromatic blocks, for example. In addition, it is also possible for identical or different A blocks to be present.

Vinylaromatics for formation of the A block preferably include styrene, α-methylstyrene and/or other styrene derivatives. The A block may thus be in the form of a homo- or copolymer. More preferably, the A block is a polystyrene.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

More preferably, the conjugated dienes as monomers for the soft block B are selected from butadiene and isoprene. For example, the soft block B is a polyisoprene or a polybutadiene or a polymer of a mixture of butadiene and isoprene. Most preferably, the B block is a polybutadiene.

A blocks in the context of this invention are also referred to as "hard blocks". B blocks, correspondingly, are also called "soft blocks" or "elastomer blocks". This reflects the inventive selection of the blocks in accordance with their glass transition temperatures (for A blocks at least 25° C., more particularly at least 50° C., and for B blocks at most 25° C., more particularly at most −25° C.). These figures are based on the pure, unblended block copolymers and may be ascertained for example by means of DSC (test IV).

The fraction of hard block in the block copolymers is at least 12 wt % and not more than 40 wt %, preferably at least 15 wt % and not more than 35 wt %, and especially in the case of polybutadiene-containing block copolymers very preferably at least 20 wt %.

A linear triblock or multiblock copolymer preferably has a peak molar mass according to test V (i) of at least 100 000 g/mol or even at least 125 000 g/mol.

A radial or star-shaped block copolymer preferably has a peak molar mass according to test V (i) of at least 150 000 g/mol or even at least 200 000 g/mol.

A diblock copolymer preferably has a peak molar mass according to test V (i) of at least 50 000 g/mol or even at least 80 000 g/mol.

In one preferred embodiment the fraction of the vinylaromatic block copolymers, more particularly styrene block copolymers, in total, based on the total pressure-sensitive adhesive (layer), is at least 42% by weight and not more than 55% by weight, more preferably at least 45 wt % and not more than 52% by weight.

Too low a fraction of vinylaromatic block copolymers results in relatively low thermal shear strength of the PSA (layer). Too high a fraction of vinylaromatic block copolymers results in turn in barely any pressure-sensitive adhesion on the part of the PSA (layer).

The block copolymers resulting from the A and B blocks may comprise identical or different B blocks, specifically in terms of microstructure (relative proportion of the types of monomer linkage that are possible for polybutadiene or polyisoprene, namely 1,4-cis, 1,4-trans, 1,2 and 3,4; preference is given to a 1,4 fraction (cis+trans) of >75 mol %, very preferably of >85 mol %, based on the polydiene blocks, and a 1,4-cis fraction of >40 mol %, based on the polydiene blocks, such as for example determinable by means of 1H NMR spectroscopy) and/or chain length. A high fraction of 1,4-linkage and more particularly 1,4-cis-linkage of the monomer units in the polydiene blocks leads to a lower glass transition temperature, allowing good shock resistance to be achieved even in a cold environment. Polybutadiene is also preferred, therefore, as a variety for the B block or B blocks.

Commercially available block copolymer types frequently have a combination of polymers of different architecture. Accordingly, for example, Europrene Sol T190, nominally a linear polystyrene-polyisoprene triblock copolymer, comprises 25% diblock copolymer according to manufacturer report (Versalis Europrene Sol T/TH technical brochure, 2018). The particulars given above for the molar mass of the block copolymers relate in each case to the mode of polymer which a skilled person is able to assign to the block copolymer architecture identified in the corresponding context. In this context, particulars for the molar mass are to be understood as peak molar mass. GPC (test Vi) typically enables the ascertainment of the molar mass of the individual polymer modes in a mixture of various block copolymers.

Tackifier Resin Component (b)

The foamable PSAs or foamed PSA layers comprise not only the at least one vinylaromatic block copolymer but also at least one tackifier resin in order to increase the adhesion in a desired manner. The tackifier resin ought to be compatible with the elastomer block of the block copolymers.

A "tackifier resin", according to the general understanding of those skilled in the art, is understood to mean an oligomeric or polymeric resin that increases adhesion (tack, intrinsic tackiness) of the pressure-sensitive adhesive compared to the pressure-sensitive adhesive that does not contain any tackifier resin but is otherwise identical.

Tackifier resins are specific compounds having a low molar mass by comparison with the elastomers, typically having a weight-average molecular weight (test Vii) $M_w$<5000 g/mol. The weight-average molecular weight is typically from 400 to less than 5000 g/mol, preferably from 500 to 2000 g/mol.

The tackifier resin component (b) comprises at least one variety K1 of a rosin oligomer having a softening temperature (ring & ball, test VI) of at least 90° C., specifically with a fraction, based on the tackifier resin component, of at least 4 wt % and not more than 100 wt %. The tackifier resin component preferably comprises 5 to 70 wt %, more preferably 10 to 50 wt % and more particularly 15 to 40 wt %, such as, for example, 20 wt % to 30 wt %, of at least one representative of this tackifier resin variety K1. It is also possible for two or more representatives of this tackifier resin variety K1 to be used in combination. If the softening temperature is too low, the desired increase in shock resistance is not obtained.

A rosin oligomer in the sense of this invention is typically understood to be a compound in the above-described molar mass range ($M_w$<5000 g/mol) which as structural elements comprises two structural units originating from rosin, selected more particularly from abietic acid, neoabietic acid, palustric acid, dihydroabietic acid, dehydroabietic acid, pimaric acid, isopimaric acid, derivatives of these and mixtures of these. Suitability is possessed for example by dimerized compounds and very advantageously by esters which contain two, three, four or more rosin units. The tackifier resins may be hydrogenated, stabilized or disproportionated.

The rosin oligomer of the variety K1 preferably has at least proportionally an acid number of at most 100 mg KOH/g, very preferably of at most 50 mg KOH/g, to an extent for example of at least 75 wt %, such as more particularly 100 wt %.

The tackifier resin component (b) may comprise further tackifier resins besides the rosin oligomer of the variety K1.

The tackifier resin component (b) may further preferably comprise, for example, at least one variety K2 of a tackifier resin which possesses a DACP (diacetone alcohol cloud point, test VII) of greater than −20° C., preferably greater than 0° C., and a softening temperature (ring & ball, test VI) of greater than or equal to 70° C., preferably greater than or equal to 100° C. and at most +140° C. In this preferred configuration, the tackifier resin component (b) contains typically up to 96 wt %, preferably at least 30 wt % and not more than 95 wt %, more preferably 50 to 90 wt %, more preferably still 60 to 85 wt % and more particularly 70 to 80 wt % of this tackifier resin variety K2. Suitable representatives of the tackifier resin variety K2 are nonpolar hydrocarbon resins, for example hydrogenated and non-hydrogenated polymers of dicyclopentadiene, non-hydrogenated, partly, selectively or fully hydrogenated hydrocarbon resins based on $C_5$, $C_5/C_9$ or $C_9$ monomer streams and polyterpene resins based on α-pinene and/or β-pinene and/or δ-limonene. Aforesaid tackifier resins may be used both alone and in a mixture, with the skilled person for polyisoprene block copolymers and/or polybutadiene block copolymers selecting from the tackifier resins of the variety K2 in accordance with commonplace guidelines for compatibility. For this purpose, for example, it is possible to consult a publication by C. Donker (C. Donker, Proceedings of the Pressure Sensitive Tape Council, 2001, pp. 149-164).

The fraction of tackifier resin component (b) in the PSA formulation affects the bond strength. The tackifier resin fraction ought therefore not to be too low. It has nevertheless emerged that too high a fraction of tackifier resin or resins has an adverse effect on the shock resistance. Therefore, for the purposes of this invention, the fraction of tackifier resin component (b), such as especially K1+K2, is at least 37.7 wt % and not more than 58 wt %, preferably at least 45 wt % and not more than 55 wt %, based in each case on the total PSA or PSA layer.

Plasticizer Resin Component (c)

The plasticizer resin or plasticizer resin mixture which may optionally be used serves for the final fine-tuning of the cohesion/adhesion balance. It typically has a softening temperature of <30° C. (*ring & ball, test VI) and is very preferably a plasticizer resin or plasticizer resin mixture having a melt viscosity at 25° C. and 1 Hz of at least 20 Pa*s, preferably of at least 50 Pa*s. The melt viscosity is determined by test VIII. The plasticizer resin may be a rosin-based or very preferably be a hydrocarbon-based or polyterpene-based plasticizer resin. In relation to the overall adhesive (layer), the plasticizer resin or plasticizer resin mixture is used with a fraction of 0 wt % to 15 wt %, and preferably of at least 2 wt % and at most 10 wt %. Too high a fraction of plasticizer resin causes a decrease in the cohesion, with adverse consequences for the thermal shear strength.

Customary plasticizers of low viscosity such as mineral oils are not advantageous in the sense of this invention, but may likewise be used. In that case their proportion in the overall formula is preferably below 5 wt %, and very preferably such plasticizers are not used at all. A disadvantage of low-viscosity plasticizers is the risk of migration into layers in contact with the PSA layer, or else residues after any detachment of the self-adhesive tape from a bonding substrate.

Optional Further Constituents (d)

The foamable pressure-sensitive adhesive or foamed pressure-sensitive adhesive layer may be admixed with further additives, especially inhibitors. These include aging inhibitors of primary and secondary types, light stabilizers and UV protectants, and also flame retardants, and additionally fillers, dyes, and pigments. The adhesive (layer) may accordingly be given any desired color or may be white, gray, or black.

Further additives of this kind, or others, that can typically be utilized are:

- plasticizers, for example low-molecular-weight liquid polymers, for example low-molecular-weight polybutenes, preferably having a fraction of 0.2 to below 5 wt % based on the total weight of the pressure-sensitive adhesive (layer),
- primary antioxidants, for example sterically hindered phenols, preferably with a fraction of 0.2 to 1 wt %, based on the total weight of the pressure-sensitive adhesive (layer),
- secondary antioxidants, for example phosphites or thioethers,
- preferably with a fraction of 0.2 to 1 wt %, based on the total weight of the pressure-sensitive adhesive (layer),
- process stabilizers, for example C-radical scavengers,
- preferably with a fraction of 0.2 to 1 wt %, based on the total weight of the pressure-sensitive adhesive (layer),
- light stabilizers, for example UV absorbers or sterically hindered amines,
- preferably with a fraction of 0.2 to 1 wt %, based on the total weight of the pressure-sensitive adhesive (layer),
- processing auxiliaries,
- preferably with a fraction of 0.2 to 1 wt %, based on the total weight of the pressure-sensitive adhesive (layer),
- end block reinforcer resins,
- if desired, preferably with a fraction of 0.2 to 10 wt %, based on the total weight of the pressure-sensitive adhesive (layer), and
- optionally further polymers that are preferably elastomeric in nature; correspondingly utilizable elastomers include, inter alia, those based on pure hydrocarbons, for example unsaturated polydienes such as natural or synthetically produced polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogenated, acrylated, allyl or vinyl ether-containing polyolefins, preferably with a fraction of 0.2 to less than 10 wt %, based on the total weight of the pressure-sensitive adhesive (layer).

The nature and amount of the blend components may be selected as required, and the amount may also be higher than the preferred upper limits.

It is also in accordance with the invention for the adhesive (layer) not to include some or even all of the stated adjuvants in each case.

(e) Microballoons

The present invention relates to a foamable PSA which contains expandable, i.e. unexpanded, microballoons. It also relates to a foamed PSA layer which comprises microballoons which are in an at least partly expanded state.

The term "at least partly expanded microballoons" is typically understood in accordance with the invention to mean that the microballoons in their entirety are expanded at least to an extent such as to bring about a density reduction of the adhesive to a technically sensible extent, in comparison to the same adhesive with the unexpanded microballoons. This means that the microballoons need not necessarily be fully expanded. The individual microballoons, each considered for themselves, are preferably expanded to at least twice their maximum extent in the unexpanded state. Moreover, the term "at least partly expanded microballoons" may also mean that only some of the microballoons under consideration have undergone (incipient) expansion. In one preferred embodiment of the foamed PSA layer, the microballoons are fully expanded—that is, the layer has been foamed such that, for a given microballoon fraction, a minimum density of the layer is achieved.

The foaming is in particular accomplished by the introduction and subsequent expansion of microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of microballoon types are commercially available, which differ essentially in terms of their size (diameter 6 to 45 μm in the unexpanded state) and the starting temperatures that they require for expansion (75 to 220° C.). An example of commercially available microballoons are the Expancel® DU grades (DU=dry unexpanded) from Nouryon; another example are Matsumoto Microsphere® F/FN from Matsumoto Yushi Seiyaku.

Unexpanded microballoon products are also available in the form of an aqueous dispersion having a solids/microballoon content of around 40% to 45 wt %, and additionally also in the form of polymer-bound microballoons (masterbatches), for example in ethyl vinyl acetate with a microballoon concentration of around 65 wt %. The microballoon dispersions and the masterbatches as well, like the DU grades, are conceivable for production of a foamed pressure-sensitive adhesive of the invention.

A foamed pressure-sensitive adhesive layer of the invention may also be produced with what are called pre-expanded microballoons. In the case of this group, the expansion already takes place prior to mixing into the polymer matrix. Pre-expanded microballoons are commercially available, for example, under the Dualite® name from Chase Corp, or with the product designation Expancel DE (Dry Expanded) from Nouryon.

In the invention preferably at least 90% of all cavities formed by microballoons in the foamed PSA layer have a maximum diameter of 20 to 75 μm, more preferably of 25 to 65 μm. The "maximum diameter" is understood to mean the maximum extent of a microballoon in any spatial direction in the cryofracture edge in SEM.

The diameters are determined on the basis of a cryofracture edge in a scanning electron microscope (SEM) at 500 times magnification. For each individual microballoon, the diameter is ascertained by graphical means.

If foaming is effected by means of microballoons, the microballoons can then be supplied to the formulation as a batch, paste or unblended or blended powder. In addition, they may be suspended in solvents.

In the invention the fraction of the microballoons in the adhesive (layer) is typically 0.3 wt % to 2.5 wt %, preferably between 0.5 wt % and 2.0 wt % and very particularly between 0.7 wt % and 1.7 wt %, based in each case on the total composition of the adhesive (layer).

With regard to the foamable adhesive, the figures are based typically on unexpanded microballoons, and with regard to the foamed adhesive layer they are based typically on the unexpanded or pre-expanded microballoons employed.

A PSA utilized in the invention and comprising expandable hollow microbeads may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

More important than the amount of microballoons used, in terms of the performance of the PSA layer, is the density thereof. The density of the foamed PSA layer of the invention, as determined by test IX, is at least 600 kg/m$^3$ and at most 920 kg/m$^3$, preferably at least 650 kg/m$^3$ and at most 870 kg/m$^3$, very preferably at least 700 kg/m$^3$ and at most 820 kg/m$^3$. For an identical amount used, larger microballoons allow lower densities to be achieved.

In order to obtain the performance desired for the purposes of the present object, correspondingly fewer larger microballoons are used than smaller microballoons. The typical range of usage quantity is especially advantageous for microballoons having a maximum diameter of below 40 μm. For microballoons having a diameter in expanded form of 40 μm, less than 2.0% is used.

The invention relates, moreover, to self-adhesive products, especially double-sidedly adhesive self-adhesive products, i.e., more particularly, double-sided adhesive tapes, which comprise at least one pressure-sensitive adhesive layer of the invention. Especially advantageous are adhesive transfer tapes. Alternatively the self-adhesive product may also comprise a (permanent) intermediate carrier.

Self-adhesive tapes produced using at least one PSA layer of the invention may therefore be configured in particular as

- single-layer, double-sidedly self-adhesive tapes, referred to as "transfer tapes" composed of a single PSA layer of the invention;
- multilayer double-sidedly self-adhesive tapes, in which the layers consist in each case of the PSA layers of the invention, or of a PSA layer of the invention and a PSA layer not of the invention;
- double-sidedly self-adhesively furnished adhesive tapes having an intermediate carrier (a so-called permanent carrier), which is disposed either in a layer of adhesive or between two layers of adhesive.

Preference is given to single-layer, double-sidedly self-adhesive products composed of a single PSA layer of the invention.

Also preferred is an embodiment of the self-adhesive product wherein the intermediate carrier consists only of a single layer, more particularly of a polymer film. It is preferred, moreover, if the intermediate carrier comprises at least one layer of a formulation which comprises at least one variety of a vinylaromatic block copolymer and at least one variety of a tackifier resin. The double-sided products here, irrespective of the nature of intermediate carrier, may have a symmetrical or asymmetrical product construction in terms of the nature of the PSA layers, such as composition and/or thickness of the PSA layers, for example.

Typical converted forms of the pressure-sensitive adhesive layer of the invention are adhesive tape rolls and adhesive strips as obtained, for example, in the form of die-cut parts.

Preferably, all layers are essentially in the shape of a cuboid. Further preferably, all layers are bonded to one another over the full area.

In a further configuration, the shape of die-cut parts is other than that of a cuboid. There may be particular advantage to shapes for which angles between width and length of the die-cut part are greater or less than 90°, i.e., shapes exhibiting tapers. Die-cut parts may also be a structure of interconnecting lines of adhesive tape which also encircle regions free from adhesive tape. Die-cut parts may also comprise various kinds of other forms of cutouts.

In the context of the present invention the general expression "adhesive tape" comprises all sheet-like structures such as films or film sections extended in two dimensions, tapes having extended length and limited width, tape sections and the like, and lastly also die-cut parts or labels.

The adhesive tape thus has a longitudinal extent and a lateral extent. The adhesive tape also has a thickness that runs perpendicular to the two extents, the lateral extent and longitudinal extent possibly being many times greater than the thickness. The thickness is very much the same, preferably substantially the same, over the entire areal extent of the adhesive tape as defined by its length and width.

The adhesive tape is more particularly in the form of a sheeting web. A sheeting web is to be understood as meaning an object whose length is many times greater than its width, where the width over the entire length remains roughly and preferably exactly the same. The adhesive tape can be produced in the form of a roll, i.e. in the form of a rolled-up Archimedean spiral.

Also conceivable are applications of adhesive layers of the invention in self-adhesive products, i.e. more particularly, adhesive tapes which can be extracted from an adhesive bond substantially without residue and without destruction, by extensive stretching, in the bond plane, for example; such products are referred to as strippable adhesive-film strips or self-adhesive strips.

In order for strippable adhesive-film strips known in this context to be able to be redetached easily and without residue, they have to possess certain technical adhesive properties:

- on stretching, there must be a marked reduction in the tack of the adhesive-film strips. The lower
- the bonding performance in the stretched state, the less the damage to the substrate during detachment.

This property is particularly clearly apparent in the case of adhesives based on vinylaromatic block copolymers in which tack falls to below 10% in the region of the yield point.

In order that strippable adhesive tapes can be redetached easily and without residue, they must also have some particular mechanical properties as well as the above-described technical adhesive properties.

Particularly advantageously, the ratio of tear strength and stripping force is greater than two,

- preferably greater than three. Such strips therefore additionally exhibit good tear resistance as well as the combination of high thermal shear strength, high bond strength and high shock resistance.

The stripping force is that force which has to be expended in order to part an adhesive strip from a bondline again by parallel pulling in the direction of the bond plane. This stripping force is composed of the force which is needed as described above for the detachment of the adhesive tape from the bonding substrates and the force that has to be expended for deformation of the adhesive tape. The force required to deform the adhesive tape depends on the thickness of the adhesive-film strip.

The force required for detachment, by contrast, is independent of the thickness of the adhesive strips within the range of thickness of the adhesive-film strip (50 μm to 800 μm) under consideration.

The tensile capacity, on the other hand, rises in proportion with the thickness of the adhesive strips. It follows from this that, for self-adhesive tapes having a single-layer construction, of the kind that are disclosed in DE 33 31 016 C2, the tensile strength below a certain thickness is lower than the peeling force. Above a certain thickness, on the other hand, the ratio of peeling force to stripping force is greater than two.

Foamed PSA layers of the invention are employed as described above in self-adhesive products. These self-adhesive products may have an adhesive sheet, adhesive tape or adhesive die-cut configuration. The self-adhesive products include at least one foamed PSA layer of the invention. This layer may have a layer thickness of 10 to 2000 μm. The thickness is preferably between 15 μm and 250 μm, more preferably between 25 μm and 150 μm, and more particularly it is at most 100 μm. Example layer thicknesses are 30 μm, 50 μm, 75 μm, 100 μm, 125 μm, 150 μm, 200 μm and 250 μm. Likewise preferred are layer thicknesses of 500 to 2000 μm, such as more particularly 1000 to 1500 μm. The thickness may for example be 750 or 1000 μm. The self-adhesive products are typically double-sidedly adhesive in their configuration. The preferences of the formulations of the invention can be utilized to particularly good effect in double-sidedly adhesive self-adhesive products when two components, and more particularly in a mobile device, are to be bonded to one another.

The inventive concept also embraces constructions having an intermediate carrier (also called permanent carrier) within the self-adhesive product, especially in the middle of the single layer of pressure-sensitive adhesive. In particular the intermediate carrier is extensible, in which case the extensibility of the intermediate carrier must be sufficient for many applications in order to ensure detachment of the adhesive strip by extensive stretching. The intermediate carriers used may, for example, be very extensible films. A maximum extensibility of the film in at least one direction, preferably in both directions, of at least 250%, preferably of at least 400% (ISO 527-3), is advantageous. Examples of advantageously usable extensible intermediate carriers are embodiments from WO 2011/124782 A1, DE 10 2012 223 670 A1, WO 2009/114683 A1, WO 2010/077541 A1, WO 2010/078396 A1.

The extensible intermediate carrier film is produced using film-forming or extrudable polymers, which may additionally be mono- or biaxially oriented.

In one configuration, polyolefins are used. Preferred polyolefins are prepared from ethylene, propylene, butylene and/or hexylene, where it is possible in each case to polymerize the pure monomers or to copolymerize mixtures of the monomers mentioned. It is possible via the polymerization process and by the choice of monomers to control the physical and mechanical properties of the polymer film, for example the softening temperature and/or the elongation at break.

With preference it is possible to use polyurethanes as starting materials for extensible intermediate carrier layers. Polyurethanes are chemically and/or physically crosslinked polycondensates that are typically formed from polyols and isocyanates. According to the nature and use ratio of the individual components, extensible materials that can be used advantageously in the context of this invention are obtainable. Raw materials available to the formulator for this purpose are specified, for example, in EP 0 894 841 B1 and EP 1 308 492 B1. The skilled person is aware of further raw materials from which intermediate carrier layers of the invention may be constructed.

It is conceivable, additionally, to use rubber-based materials in intermediate carrier layers in order to achieve extensibility. As rubber or synthetic rubber or blends produced therefrom as starting material for extensible intermediate carrier layers, the natural rubber may in principle be chosen from all available qualities, for example crepe, RSS, ADS, TSR or CV types, according to the required level of purity and viscosity, and the synthetic rubber(s) may be chosen from the group of the randomly copolymerized styrene-butadiene rubbers (SBR), the butadiene rubbers (BR), the synthetic polyisoprenes (IR), the butyl rubbers (IIR), the halogenated butyl rubbers (XIIR), the acrylate rubbers (ACM), the ethylene-vinyl acetate copolymers (EVA) and the polyurethanes and/or blends thereof.

Materials usable particularly advantageously for extensible intermediate carrier layers are block copolymers. Individual polymer blocks here are covalently bonded to one another. The block bonding may be in a linear form, or else in a star-shaped or graft copolymer variant. One example of an advantageously usable block copolymer is a linear triblock copolymer, the two terminal blocks of which have a softening temperature of at least 40° C., preferably at least 70° C., and the middle block of which has a softening temperature of at most 0° C., preferably at most −30° C. Higher block copolymers, for instance tetrablock copolymers, are likewise usable. It is important that at least two polymer blocks of the same or different kinds that are present in the block copolymer each have a softening temperature of at least 40° C., preferably at least 70° C., and are separated from one another in the polymer chain by at least one polymer block having a softening temperature of not more than 0° C., preferably not more than −30° C. Examples of polymer blocks are polyethers, for example polyethylene glycol, polypropylene glycol or polytetrahydrofuran, polydienes, for example polybutadiene or polyisoprene, hydrogenated polydienes, for example polyethylene-butylene or polyethylene-propylene, polyesters, for example polyethylene terephthalate, polybutanediol adipate or polyhexanediol adipate, polycarbonate, polycaprolactone, polymer blocks of vinylaromatic monomers, for example polystyrene or poly-[α]-methylstyrene, polyalkyl vinyl ethers, polyvinyl acetate, polymer blocks of [α],[β]-unsaturated esters such as, in particular, acrylates or methacrylates. Corresponding softening temperatures are known to those skilled in the art. Alternatively, the person skilled in the art will look them up, for example, in the Polymer Handbook [J. Brandrup, E. H. Immergut, E. A. Grulke (eds.), Polymer Handbook, 4th edn. 1999, Wiley, New York]. Polymer blocks may be formed from copolymers.

For production of an intermediate carrier material, it may here as well be appropriate to add additives and further components that improve the film-forming properties, which reduce the tendency toward formation of crystalline segments, and/or selectively improve or else, possibly, worsen the mechanical properties.

Also suitable are foam materials in sheet form (polyethylene and polyurethane foams, for example).

The intermediate carriers may have a multi-ply configuration.

In addition, the intermediate carriers may have outer layers, for example barrier layers, which prevent penetration of components from the adhesive into the intermediate carrier or vice versa. These outer layers may also have barrier properties in order thus to prevent through-diffusion of water vapor and/or oxygen.

For better anchoring of the PSAs on the intermediate carrier, the intermediate carriers may be pretreated by the known measures such as corona, plasma or flaming. The utilization of a primer is also possible. Ideally, however, it is possible to dispense with pretreatment.

Also embraced by the inventive concept are constructions comprising an intermediate carrier with a high modulus of elasticity and low extensibility within the self-adhesive product, more particularly in the middle of the single layer of pressure-sensitive adhesive, where the elasticity modulus of the intermediate carrier is advantageously at least 750 MPa, preferably at least 1 GPa (ISO 527-3) and the maximum extensibility (according to ISO 527-3) is more particularly at most 200%. Constructions of this kind can be used particularly well in die-cutting operations and facilitate handling in the application process. One advantage also attaches to permanent carriers with this kind of architecture when the aim is to enable redetachment of the self-adhesive product by peeling.

Such intermediate carrier films are produced using film-forming or extrudable polymers, which in particular may additionally be mono- or biaxially oriented.

Appropriate film material for the at least one ply of a film for this embodiment comprises in particular polyester films, and here more preferably films based on polyethylene terephthalate (PET). Polyester films are preferably biaxially oriented. Also conceivable are films made of polyolefins, more particularly of polybutene, cycloolefin copolymer, polymethylpentene, polypropylene or polyethylene, such as of monoaxially oriented polypropylene, biaxially oriented polypropylene or biaxially oriented polyethylene, for example. This enumeration is intended to indicate examples; the skilled person is aware of further systems which correspond to the concept of the present invention.

For production of an intermediate carrier material, it may here as well be appropriate to add additives and further components that improve the film-forming properties, which reduce the tendency toward formation of crystalline segments, and/or selectively improve or else, possibly, worsen the mechanical properties.

The intermediate carriers may have a multi-ply configuration.

In addition, the intermediate carriers may have outer layers, for example barrier layers, which prevent penetration of components from the adhesive into the intermediate carrier or vice versa. These outer layers may also have barrier properties in order thus to prevent through-diffusion of water vapor and/or oxygen.

In multilayer products, it is advantageously ensured when selecting the individual components for the various layers that substantially no components of one layer can diffuse into an adjacent layer.

For better anchoring of the PSA layers on the intermediate carrier, the intermediate carriers may be pretreated by the known measures such as corona, plasma or flaming. The utilization of a primer is also possible. Ideally, however, it is possible to dispense with pretreatment.

The thickness of the intermediate carrier layer, independently of its extensibility, is typically in the range, here, of 2 μm to 200 μm, preferably between 5 and 100 μm and more particularly between 10 and 80 μm.

Lastly, the self-adhesive product, such as an adhesive tape in particular, may be lined on one or both sides with a liner, in other words with a temporary carrier which has an antiadhesive coating on one or both sides.

A liner (release paper, release film) is not part of an adhesive tape, but merely an auxiliary for production or storage thereof or for further processing by die-cutting. Furthermore, a liner, in contrast to an adhesive tape carrier, is not securely bonded to a layer of adhesive.

The formulations, i.e., pressure-sensitive adhesives (PSAs), and the coatings and/or self-adhesive products produced from them, may be produced using organic solvents, or solventlessly.

In the method of the invention the substrate is preferably a sheetlike element, more particularly a carrier material, a film, a (release) liner, a transfer material and/or a covering material. Substrates may also be the surfaces of the production line in the production method. In this case a pressure-sensitive adhesive is processed into at least one pressure-sensitive adhesive layer with a thickness of greater than or equal to 15 μm or even greater than or equal to 10 μm, and the pressure-sensitive adhesive layer applied areally is optionally dried, or the solvents are removed. In a further preferred embodiment, a hot-melt adhesive is processed solventlessly.

Coating methods employable for the sheetlike elements used in the invention, for applying the pressure-sensitive adhesive, include knife processes, nozzle knife processes, rolling-rod nozzle processes, extrusion die processes, casting die processes and caster processes. Likewise in accordance with the invention are application processes such as roll application processes, printing processes, screen-printing processes, halftone roll processes, inkjet processes and spraying processes. Preference is given to hotmelt processes (extrusion, die, nozzle).

Subsequently, if desired, further layers or plies of material are coated or laminated on inline or offline, thus allowing multilayer/multi-ply product constructions to be produced as well.

In a further configuration of the method of the invention, the resultant combination of sheetlike element and pressure-sensitive adhesive is cut into continuous product comprising tapes, and/or die-cut parts are cut out, and the tapes, optionally, are rolled up to form a roll.

The invention, lastly, also extends to adhesive assemblies obtained using self-adhesive products which comprise at least one PSA layer of the invention. That is, the invention relates to an assembly composed of an adhesive tape of the invention and two substrates, such as in particular components of a mobile device which are joined using the adhesive tape.

The invention additionally refers with particular preference to the bonding of mobile devices, since the adhesive tape used in the invention has a particular benefit here on account of the unexpectedly good properties (very high shock resistance). Listed below are a number of portable devices, i.e., mobile devices, without wishing the representatives specifically identified in this list to impose any unnecessary restriction with regard to the subject matter of the invention.

- cameras, digital cameras, photography accessories (such as light meters, flashguns, diaphragms, camera casings, lenses, etc.), film cameras, video cameras
- small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems,

- computer accessories and operating units for electronic devices, such as mice, drawing pads, graphics tablets, microphones, loudspeakers, games consoles, gamepads, remote controls, remote operating devices, touchpads
- monitors, displays, screens, touch-sensitive screens (sensor screens, touchscreen devices), projectors
- reading devices for electronic books ("E-books")
- mini TVs, pocket TVs, devices for playing films, video players
- radios (including mini and pocket radios), Walkmans, Discmans, music players for e.g. CDs, DVDs, Blu-ray, cassettes, USB, MP3, headphones
- cordless telephones, cellphones, smartphones, two-way radios, hands-free telephones, devices for summoning people (pagers, bleepers)
- mobile defibrillators, blood sugar meters, blood pressure monitors, step counters, pulse meters
- torches, laser pointers
- mobile detectors, optical magnifiers, binoculars, night vision devices
- GPS devices, navigation devices, portable interface devices for satellite communications
- data storage devices (USB sticks, external hard drives, memory cards)
- wristwatches, digital watches, pocket watches, chain watches, stopwatches.

Test Methods

All measurements for determining adhesive properties were conducted, unless otherwise indicated, at 23° C. and 50% relative atmospheric humidity.

Test I—Peel Adhesion

The determination of the peel adhesion (according to AFERA 5001) is conducted as follows. The defined adhesion substrate used is a polished steel plate 2 mm in thickness. The bondable sheetlike element to be examined (furnished on the rear with a 36 μm etched PET film as supporting film) is trimmed to a width of 20 mm and a length of about 25 cm, provided with a handling section, and immediately thereafter pressed down five times onto the respective bonding substrate chosen, using a 4 kg steel roller at an advance rate of 10 m/min. Immediately thereafter, the bondable sheetlike element is pulled away from the bonding substrate at an angle of 180° with a tensile tester (from Zwick) at a velocity v=300 mm/min, and the force required for this purpose at room temperature is measured. The measured value (in N/cm) is obtained as the average value from three individual measurements.

Test II—Thermal Shear Strength (SAFT)

This test serves for rapid testing of the shear strength of adhesive tapes under thermal stress. For this purpose, the adhesive tape to be examined is adhered to a temperature-controllable steel plate and loaded with a weight (50 g), and the shear distance is recorded. Test sample preparation:

The adhesive tape to be examined (50 μm transfer tape) is adhered by one of the adhesive sides to an aluminum foil 50 μm thick. The adhesive tape thus treated is cut to a size of 10 mm*50 mm.

The trimmed adhesive tape sample is bonded with the other adhesive side to a polished steel test plate (material 1.4301, DIN EN 10088-2, surface 2R, surface roughness Ra=30 to 60 nm, dimensions 50 mm*13 mm*1.5 mm) that has been cleaned with acetone, the bond being made such that the bond area of the sample in terms of height*width=13 mm*10 mm and the steel test plate protrudes by 2 mm at the upper edge. Subsequently, a 2 kg steel roller is rolled over six times at a speed of 10 m/min for fixing. The sample is reinforced flush at the top with a stable adhesive strip which serves as contact point for the distance sensor. Then the sample is suspended by means of the steel plate such that the longer protruding end of the adhesive tape points vertically downward.

Measurement:

The sample for measurement is loaded at the bottom end with a 50 g weight. The steel test plate with the bonded sample is heated starting at 25° C. at a rate of 9 K/min to the final temperature of 200° C.

The distance sensor is used to observe the slip distance of the sample as a function of temperature and time. The maximum slip distance is fixed at 1000 μm (1 mm); if exceeded, the test is discontinued and the failure temperature is noted. Test conditions: room temperature 23+/−3° C., relative atmospheric humidity 50+/−5%. The result is reported as the mean value from two individual measurements, and is expressed in ° C.

Test III—Anti-Smash Toughness; z-Plane (DuPont Test)

A square sample in the shape of a frame is cut out of the adhesive tape to be examined (external dimensions 33 mm×33 mm; border width 2.0 mm; internal dimensions (window cut-out) 29 mm×29 mm). This sample is stuck to a polycarbonate (PC) frame (external dimensions 45 mm×45 mm; border width 10 mm; internal dimensions (window cut-out) 25 mm×25 mm; thickness 3 mm). A PC window of 35 mm×35 mm is stuck to the other side of the double-sided adhesive tape. The bonding of PC frame, adhesive tape frame and PC window is effected such that the geometric centers and the diagonals were each superimposed on one another (corner-to-corner). The bonding area is 248 $mm^2$. The bond is subjected to a pressure of 248 N for 5 s and stored under conditions of 23° C./50% relative humidity for 24 hours.

Immediately after the storage, the bonded assembly composed of PC frame, adhesive tape and PC window is clamped by the protruding edges of the PC frame into a sample holder in such a way that the assembly is aligned horizontally. The PC frame rests flat here at the protruding edges on the sample holders, and so below the PC frame the PC window was free-floating (held by the adhesive tape specimen). The sample holder is then inserted centrally into the intended receptacle of the "DuPont Impact Tester". The impact head, weighing 150 g is inserted such that the circular impact geometry with a diameter of 24 mm lies centrally and flush to the face of the PC window that is freely accessible from above.

A weight having a mass of 150 g guided on two guide rods is allowed to drop vertically from a height of 5 cm onto the composite assembly thus arranged, composed of sample holder, sample and impact head (test conditions: 23° C., 50% relative humidity). The height from which the weight dropped is increased in 5 cm steps until the impact energy introduced destroys the sample as a result of the smash loading and the PC window parted from the PC frame.

In order to be able to compare experiments with different samples, the energy is calculated as follows:

$$E[\mathrm{J}]=\text{height [m]}*\text{mass of weight [kg]}*9.81\ \mathrm{kg/m*s^2}$$

Five samples per product are tested, and the mean energy was reported as the index for anti-smash toughness.

Test IV—Glass Transition Temperature (DSC)

The glass transition temperature of polymer blocks in block copolymers is determined by means of dynamic scanning calorimetry (DSC). For this test, about 5 mg of the untreated block copolymer samples are weighed out into an aluminum crucible (volume 25 μl) and closed with a perforated lid. For the measurement, a DSC 204 F1 from Netzsch is used and is operated under nitrogen for inertization. The sample is first cooled to −150° C., heated to +150° C. at a heating rate of 10 K/min, and cooled again to −150° C. The subsequent second heating curve is run again at 10 K/min, and the change in the heat capacity is recorded. Glass transitions are recognized as steps in the thermogram. The glass transition temperature is evaluated as follows (in this regard, see FIG. 1). A tangent is applied in each case to the baseline of the thermogram before 1 and after 2 of the step. In the region of the step, a line 3 of best fit is placed parallel to the ordinate in such a way that the two tangents intersect, specifically such as to form two areas 4 and 5 (between the respective tangent, the line of best fit, and the measurement plot) of equal content. The point of intersection of the line of best fit positioned accordingly and the measurement plot gives the glass transition temperature.

Test V—Molar Mass (GPC)

(i) Peak Molar Mass of Individual Block Copolymer Modes

GPC is appropriate as a metrological method for determining the molar mass of individual polymer modes in mixtures of different polymers. For the block copolymers which can be used for the purposes of this invention, produced by living anionic polymerization, the molar mass distributions are typically sufficiently narrow, allowing polymer modes—which can be allocated to triblock copolymers, diblock copolymers or multiblock copolymers—to appear with sufficient resolution from one another in the elugram. It is then possible to read off the peak molar mass for the individual polymer modes from the elugrams.

Peak molar masses $M_P$ are determined by means of gel permeation chromatography (GPC). The eluent used is THF. The measurement is made at 23° C. The pre-column used is PSS-SDV, 5μ, $10^3$ Å, ID 8.0 mm×50 mm. For separation, the columns used are PSS-SDV, 5μ, $10^3$ Å and $10^4$ Å and $10^6$ Å each with ID 8.0 mm×300 mm. The sample concentration is 4 g/l, the flow rate 1.0 ml per minute. Measurement is made against PS standards (μ=μm; 1 Å=$10^{-10}$ m).

(ii) Weight-Average Molar Mass, Particularly of Tackifier Resins

The weight-average molecular weight $M_w$ (M.W.) is determined by means of gel permeation chromatography (GPC). The eluent used is THF. The measurement is made at 23° C. The pre-column used is PSS-SDV, 5μ, $10^3$ Å, ID 8.0 mm×50 mm. For separation, the columns used are PSS-SDV, 5μ, $10^3$ Å and $10^4$ Å and $10^6$ Å each with ID 8.0 mm×300 mm. The sample concentration is 4 g/l, the flow rate 1.0 ml per minute. Measurement is made against PS standards (μ=μm; 1 Å=$10^{-10}$ m).

Test VI—(Tackifier) Resin Softening Temperature

The (tackifier) resin softening temperature, also known as (tackifier) resin softening point, is carried out according to the relevant methodology, which is known as ring & ball and is standardized according to ASTM E28.

Test VII—DACP 5.0 g of test substance (the tackifier resin sample to be examined) are weighed into a dry test tube, and 5.0 g of xylene (isomer mixture, CAS [1330-20-7], ≥98.5%, Sigma-Aldrich #320579 or comparable) are added. The test substance is dissolved at 130° C. and then cooled down to 80° C. Any xylene that escapes is made up for with fresh xylene, such that 5.0 g of xylene is present again. Subsequently, 5.0 g of diacetone alcohol (4-hydroxy-4-methyl-2-pentanone, CAS [123-42-2], 99%, Aldrich #H41544 or comparable) are added. The test tube is shaken until the test substance has dissolved completely. For this purpose, the solution is heated to 100° C. The test tube containing the resin solution is then introduced into a Novomatics Chemotronic Cool cloud point measuring instrument and heated therein to 110° C. It is cooled down at a cooling rate of 1.0 K/min. The cloud point is detected optically. For this purpose, that temperature at which the turbidity of the solution is 70% is registered. The result is reported in ° C. The lower the DACP value, the higher the polarity of the test substance.

Test VIII—Melt Viscosity

To determine the melt viscosity of the plasticizer resins, a shear stress sweep is carried out in rotation in a shear stress-regulated DSR 200 N rheometer from Rheometrics Scientific. A cone/plate measuring system with a diameter of 25 mm (cone angle θ.1002 rad) is employed; the measuring head is air-mounted and is suitable for standard force measurements. The gap is 0.053 mm and the measuring temperature is 25° C. The frequency is varied from 0.002 Hz to 200 Hz and the melt viscosity at 1 Hz is recorded.

Test IX—Density

The density, i.e., absolute density, of an adhesive or adhesive layer is ascertained by forming the quotient of mass applied and thickness of the adhesive layer applied to a carrier or liner.

The mass applied can be determined by determining the mass of a section, defined in terms of its length and width, of such an adhesive (layer) applied to a carrier or liner, minus the (known or separately determinable) mass of a section with the same dimensions of the carrier or liner used.

The thickness of an adhesive (layer) may be determined by determining the thickness of a section, defined in terms of its length and its width, of an adhesive layer of this kind applied to a carrier or liner, minus the (known or separately determinable) thickness of a section with the same dimensions of the carrier or liner used. The thickness of the adhesive (layer) can be determined by means of commercial thickness gauges (caliper test instruments) with accuracies of less than 1 μm deviation. In the present application, the Mod. 2000 F precision thickness gauge from Wolf Messtechnik GmbH is used, which has circular calipers having a diameter of 10 mm (planar). The measuring force is 4 N. The value is read off 1 s after loading. If variations in thickness are found, the average of measurements at at least three representative sites is reported, i.e. more particularly not measured at creases, folds, specks and the like.

EXAMPLES

The PSA (layer) of the invention is described below in preferred embodiment on the basis of a number of examples, without thereby wishing to impose any instruction whatsoever on the invention.

Also given are comparative examples, which represent unsuitable adhesive (layer) s.

microballoons are utilized here which have an expansion temperature above 100° C. If utilizing other microballoons, the skilled person selects, correspondingly, suitable production temperatures, without departing from the scope of the present invention.

After drying had taken place, the adhesive layer was lined with a second ply of PET liner as defined above, free from any air inclusions, and was foamed for 30 s at 170° C. between the two liners, while suspended in a circulation drying cabinet.

Table 2 shows the raw materials used. Tables 3a to 3f show the formulas of the inventive examples and comparative examples (% figures in the compositions are wt %) and also their characteristics.

TABLE 2 raw materials used.

| | | | |
|---|---|---|---|
| Elastomer component (a) | Calprene C4302 (Dynasol Elastomeros) | Polystyrene-polybutadiene block copolymer | Linear SBS* PS content 31%* |
| | Calprene C7318 (Dynasol Elastomeros) | Polystyrene-polybutadiene block copolymer | Linear SBS* PS content 32%* |
| | Calprene C411 (Dynasol Elastomeros) | Polystyrene-polybutadiene block copolymer | Radial SBS* PS content 30%* |
| | Europrene Sol T190 (Versalis) | Polystyrene-polyisoprene block copolymer | Linear SIS ** PS content 16%** |
| Tackifier resin component (b) | Dymerex (Eastman Chemical) | (K1) Dimerized rosin resin | Softening point 144° C. |
| | Foral 105-E (Eastman Chemical) | (K1) Hydrogenated rosin pentaerythritol ester | Softening point 101° C. |
| | Foral 85-E (Eastman Chemical) | Hydrogenated rosin glycerol ester | Softening point 85° C. |
| | Hydrogral P (DRT) | (K1) partially hydrogenated rosin pentaerythritol ester | Softening point 97° C. |
| | Dertophene T160 (DRT) | Terpene phenolic resin | Softening point 160° C. |
| | Dertophene T105 (DRT) | Terpene phenolic resin | Softening point 105° C. |
| | Regalite R1125 (Eastman Chemical) | (K2) Fully hydrogenated C9 hydrocarbon resin | Softening point 125° C. DACP = +55° C. |
| | Dercolyte A115 (DRT) | (K2) Alpha-pinene resin | Softening point 115° C. DACP = +35° C. |
| Plasticizer resin component (c) | Wingtack 10 (Cray Valley) | Aliphatic C5 liquid resin | Softening point 10° C.; melt viscosity 22 Pa s |
| Additives (d) | Irganox 1010 (BASF) | Primary aging inhibitor (sterically hindered phenol derivative) | |
| | Irgafos 168 (BASF) | Secondary aging inhibitor (Phosphoric ester) | |
| Microballoons | Expancel 920 DU20 (Nouryon) | | |

*Manufacturer data, Dynasol Elastomers;

**manufacturer data, Versalis SpA

The constituents of the pressure-sensitive adhesives (PSAs) were dissolved in this case at 40% in special-boiling-point benzene/toluene/acetone, admixed with the microballoons suspended in mineral spirit, and coated out in the desired layer thickness, using a coating bar, onto a PET film furnished with a silicone release. The solvent was then evaporated off at 100° C. for 15 min to dry the layer of composition. This is possible in the examples given, since All examples (C: comparative example; E: inventive example) contained, unless specified otherwise, 1 wt % microballoons (Expancel 920 DU20), based on the total weight of the PSA without solvent. Foamed adhesive transfer tapes were produced in 100 μm thickness. By die-cutting or cutting of strips, pressure-sensitive adhesive strips with desired dimensions were obtained.

TABLE 3a

Formulas and their characteristics.

| Raw materials | | Example C1 | Example E2 | Example E3 | Example E4 |
|---|---|---|---|---|---|
| (a) Elastomer [%] | Calprene C411 | 20.0 | 20.0 | 20.0 | 20.0 |
| | Calprene C7318 | 29.0 | 29.0 | 29.0 | 29.0 |
| (b) Tackifier resin K1 [%] | Dymerex | — | 2.5 | 5.5 | 10.0 |
| (b) Tackifier resin K2 [%] | Dercolyte A115 | 49 | 46.5 | 43.5 | 39.0 |
| (c) Plasticizer resin [%] | | — | — | — | — |
| (d) Additives [%] | Irganox 1010 | 0.5 | 0.5 | 0.5 | 0.5 |
| | Irgafos 168 | 0.5 | 0.5 | 0.5 | 0.5 |
| Shock resistance [mJ] | | 603 | 618 | 647 | 809 |
| Shock resistance improvement [%] | | 0.0 | +2.3 | +7.3 | +34.2 |
| Peel adhesion to steel 180° [N/cm] | | 6.7 | 9.2 | 8.9 | 11.9 |
| SAFT [° C.] | | 124 | 125 | 125 | 123 |
| Density [kg/m$^3$] | | 743 | 750 | 743 | 736 |

TABLE 3b

Further formulas and their characteristics.

| Raw materials | | Example C5 | Example E6 | Example E7 | Example E8 | Example E9 |
|---|---|---|---|---|---|---|
| (a) Elastomer [%] | Calprene C411 | 10.0 | 10.0 | 10.0 | 10.0 | 10.0 |
| | Calprene C4302 | 37.0 | 37.0 | 37.0 | 37.0 | 37.0 |
| (b) Tackifier resin K1 [%] | Foral 105-E | — | 5.0 | 10.0 | 18.0 | 30.0 |
| (b) Tackifier resin K2 [%] | Dercolyte A115 | 47.0 | 42.0 | 37.0 | 29.0 | 17.0 |
| (c) Plasticizer resin [%] | Wingtack 10 | 4.0 | 4.0 | 4.0 | 4.0 | 4.0 |
| (d) Additives [%] | Irganox 1010 | 0.5 | 0.5 | 0.5 | 0.5 | 0.5 |
| | Irgafos 168 | 0.5 | 0.5 | 0.5 | 0.5 | 0.5 |
| Shock resistance [mJ] | | 677 | 883 | 912 | 721 | 706 |
| Shock resistance improvement [%] | | 0.0 | +30.4 | +34.7 | +6.5 | +4.2 |
| Peel adhesion to steel 180° [N/cm] | | 6.0 | 7.8 | 7.2 | 5.8 | 5.8 |
| SAFT [° C.] | | 118 | 115 | 117 | 112 | 110 |
| Density [kg/m$^3$] | | 761 | 812 | 823 | 820 | 820 |

TABLE 3c

Further formulas and their characteristics.

| Raw materials | | Example C10 | Example E11 | Example C1 | Example E12 |
|---|---|---|---|---|---|
| (a) Elastomer [%] | Europrene Sol T190 | 50.0 | 50.0 | — | — |
| | Calprene C411 | — | — | 20.0 | 20.0 |
| | Calprene C7318 | — | — | 29.0 | 29.0 |
| (b) Tackifier resin K1 [%] | Hydrogral P | — | 10.0 | — | |
| | Foral 105-E | — | — | — | 10.0 |

TABLE 3c-continued

| Further formulas and their characteristics. | | | | | |
|---|---|---|---|---|---|
| Raw materials | | Example C10 | Example E11 | Example C1 | Example E12 |
| (b) Tackifier resin K2 [%] | Regalite R1125 | 45.0 | 35.0 | — | — |
| | Dercolyte A115 | — | — | 49.0 | 39.0 |
| (c) Plasticizer resin [%] | Wingtack 10 | 3.0 | 3.0 | — | — |
| (d) Additives [%] | Irganox 1010 | 0.5 | 0.5 | 0.5 | 0.5 |
| | Irgafos 168 | 0.5 | 0.5 | 0.5 | 0.5 |
| Shock resistance [mJ] | | 706 | 1015 | 603 | 686 |
| Shock resistance improvement [%] | | 0.0 | +44 | 0.0 | +13.8 |
| Peel adhesion to steel 180° [N/cm] | | 7.8 | 11.5 | 6.7 | 6.0 |
| SAFT [° C.] | | 112 | 107 | 124 | 126 |
| Density [kg/m$^3$] | | 784 | 813 | 743 | 784 |

TABLE 3d

| Further formulas and their characteristics. | | | | | | |
|---|---|---|---|---|---|---|
| Raw materials | | Example C5 | Example E13 | Example C14 | Example C15 | Example C16 |
| (a) Elastomer [%] | Calprene C411 | 10.0 | 10.0 | 10.0 | 10.0 | 10.0 |
| | Calprene C4302 | 37.0 | 37.0 | 37.0 | 37.0 | 37.0 |
| (b) Tackifier resin K1 [%] | Hydrogral P | — | 10.0 | — | — | — |
| (b) Tackifier resin [%] | Dertophene T160 | — | — | — | 10.0 | — |
| | Dertophene T105 | — | — | — | — | 10.0 |
| | Foral 85-E | — | — | 10.0 | — | — |
| (b) Tackifier resin K2 [%] | Dercolyte A115 | 47.0 | 37.0 | 37.0 | 37.0 | 37.0 |
| (c) Plasticizer resin [%] | Wingtack 10 | 4.0 | 4.0 | 4.0 | 4.0 | 4.0 |
| (d) Additives [%] | Irganox 1010 | 0.5 | 0.5 | 0.5 | 0.5 | 0.5 |
| | Irgafos 168 | 0.5 | 0.5 | 0.5 | 0.5 | 0.5 |
| Shock resistance [mJ] | | 677 | 883 | 633 | 544 | 574 |
| Shock resistance improvement [%] | | 0.0 | +30.4 | −6.5 | −19.6 | −15.2 |
| Peel adhesion to steel 180° [N/cm] | | 6.0 | 8.2 | 6.0 | 10.5 | 6.1 |
| SAFT [° C.] | | 118 | 115 | 111 | 115 | 125 |
| Density [kg/m$^3$] | | 761 | 820 | 805 | 780 | 792 |

| Further formulas and their characteristics. | | | |
|---|---|---|---|
| Raw materials | | Example C17 | Example E18 |
| (a) Elastomer [%] | Europrene Sol T190 | 40.0 | 60.0 |
| (b) Tackifier resin K1 [%] | Hydrogral P | 20.0 | 10.0 |
| | Foral 105-E | — | — |
| (b) Tackifier resin K2 [%] | Regalite R1125 | 35.0 | 25.0 |
| | Dercolyte A115 | — | — |

-continued

Further formulas and their characteristics.

| Raw materials | | Example C17 | Example E18 |
|---|---|---|---|
| (c) Plasticizer resin [%] | Wingtack 10 | 3.0 | 3.0 |
| (d) Additives [%] | Irganox 1010 | 0.5 | 0.5 |
| | Irgafos 168 | 0.5 | 0.5 |
| Shock resistance [mJ] | | 162 | 603 |
| Shock resistance improvement [%] | | —/—*** | —/—*** |
| Peel adhesion to steel 180° [N/cm] | | 17.4 | 7.0 |
| SAFT [°C] | | 102 | 113 |
| Density [kg/m$^3$] | | 840 | 809 |

***Improvement in shock resistance by comparison with a reference formulation not determined.

Further formulas and their characteristics.

| Raw materials | | Ex. C19 | Ex. C20 | Ex. E21 | Ex. E11 |
|---|---|---|---|---|---|
| (a) Elastomer [%] | Europrene Sol T190 | 50.0 | 49.9 | 49.7 | 50.0 |
| (b) Tackifier resin K1 [%] | Hydrogral P | 10.0 | 10.0 | 10.0 | 10.0 |
| (b) Tackifier resin K2 [%] | Regalite R1125 | 36.0 | 35.9 | 35.8 | 35.0 |
| (c) Plasticizer resin [%] | Wingtack 10 | 3.0 | 3.0 | 3.0 | 3.0 |
| (d) Additives [%] | Irganox 1010 | 0.5 | 0.5 | 0.5 | 0.5 |
| | Irgafos 168 | 0.5 | 0.5 | 0.5 | 0.5 |
| (e) Micro-balloons [%] | Expancel 920 DU20 | 0.0 | 0.2 | 0.5 | 1.0 |
| Shock resistance [mJ] | | 162 | 412 | 780 | 1015 |
| Shock resistance improvement [%] | | —/—*** | —/—*** | —/—*** | +44 |
| Peel adhesion to steel 180° [N/cm] | | 16.4 | 14.3 | 13.1 | 11.5 |
| SAFT [° C.] | | 97 | 106 | 112 | 107 |
| Density [kg/m$^3$] | | 984 | 926 | 909 | 813 |

| Raw materials | | Ex. E22 | Ex. C23 | Ex C24 |
|---|---|---|---|---|
| (a) Elastomer [%] | Europrene Sol T190 | 49.1 | 48.5 | 47.5 |
| (b) Tackifier resin K1 [%] | Hydrogral P | 9.8 | 9.7 | 9.5 |
| (b) Tackifier resin K2 [%] | Regalite R1125 | 35.2 | 34.9 | 34.2 |
| (c) Plasticizer resin [%] | Wingtack 10 | 2.9 | 2.9 | 2.8 |
| (d) Additives [%] | Irganox 1010 | 0.5 | 0.5 | 0.5 |
| | Irgafos 168 | 0.5 | 0.5 | 0.5 |
| (e) Micro-balloons [%] | Expancel 920 DU20 | 2.0 | 3.0 | 5.0 |
| Shock resistance [mJ] | | 736 | 515 | 368 |
| Shock resistance improvement [%] | | —/—*** | —/—*** | —/—*** |
| Peel adhesion to steel 180° [N/cm] | | 9.7 | 8.5 | 5.1 |
| SAFT [° C.] | | 115 | 116 | 123 |
| Density [kg/m$^3$] | | 706 | 595 | 477 |

***Improvement in shock resistance by comparison with a reference formulation not determined.

A comparison of examples C1, E2, E3 and E4 shows in particular the positive effect of the fraction of the variety K1 of a rosin oligomer having a softening temperature (ring & ball, test VI) of at least 90° C. on the shock resistance and the peel adhesion, for comparable thermal shear strength.

A comparison of examples C5 and E6 to E9, in which a different tackifier resin variety K1 is used, again shows in particular the positive effect of the fraction of the variety K1 on the shock resistance and the peel adhesion, for comparable thermal shear strength. Especially interesting in this case is that the shock resistance and the peel adhesion pass through a maximum, depending on the proportion of the variety K1.

C10 and E11 show the depicted relationships when using a different elastomer or tackifier resin K1, respectively.

C1 and E12 show the depicted relationships when using a modified elastomer composition.

A comparison of examples C5 and E13 shows that the proportional replacement of non-polar tackifier resin K2 with tackifier resin K1 leads to an improvement in the shock resistance and peel adhesion, for comparable thermal shear strength.

A comparison of examples C5 and C14 to $C_{16}$ shows that the proportional replacement of non-polar tackifier resin K2 with rosin oligomer having too low a softening temperature, or with other varieties of polar tackifier resins such as terpene phenolic resin, may in fact lead to a deterioration in the profile of properties, such as the shock resistance in particular.

Example C17 shows in particular that too low an elastomer fraction is detrimental to the shock resistance.

Table 3f indicates that the selection of the amount of microballoons used is also essential for obtaining the desired improvement in performance, particularly in the shock resistance.

The invention claimed is:

1. A foamable pressure-sensitive adhesive, comprising
a) 41.7 wt % to 62.0 wt % of an elastomer component,
b) 37.7 wt % to 58.0 wt % of a tackifier resin component,
c) 2 wt % to 10.0 wt % of a plasticizer resin component,
d) 0 wt % to 18 wt % of further additives and
e) expandable microballoons having a fraction of 0.3 wt % to 2.5 wt %,
where the elastomer component (a) comprises at least 90 wt % of polyvinylaromatic-polydiene block copolymer, and
where the tackifier resin component (b) comprises 4 wt % to 40 wt % (based on the tackifier resin component) of at least one variety of a rosin oligomer having a softening temperature (ring & ball, test VI) of at least 90° C.

2. The pressure-sensitive adhesive as claimed in claim 1, characterized in that
the pressure-sensitive adhesive comprises 45 to 55 wt % of the elastomer component.

3. The pressure-sensitive adhesive as claimed in claim 2, characterized in that
the pressure-sensitive adhesive comprises 45 to 55 wt % of the tackifier resin component.

4. The pressure-sensitive adhesive as claimed in claim 2, characterized in that
the tackifier resin component (b) contains 5 wt % to 40 wt % of at least one variety of a rosin oligomer having a softening temperature (ring & ball, test VI) of at least 90° C.

5. The pressure-sensitive adhesive as claimed in claim 1, characterized in that
the pressure-sensitive adhesive comprises 45 to 55 wt % of the tackifier resin component.

6. The pressure-sensitive adhesive as claimed in claim 5, characterized in that
the tackifier resin component (b) contains 5 wt % to 40 wt % of at least one variety of a rosin oligomer having a softening temperature (ring & ball, test VI) of at least 90° C.

7. The pressure-sensitive adhesive as claimed in claim 1, characterized in that
the tackifier resin component (b) contains 5 wt % to 40 wt % of at least one variety of a rosin oligomer having a softening temperature (ring & ball, test VI) of at least 90° C.

8. The pressure-sensitive adhesive as claimed in claim 1, characterized in that
the tackifier resin component (b) further comprises at least one variety of a tackifier resin which possesses a DACP (diacetone alcohol cloud point, test VII) of greater than-20° C. and a softening temperature (ring & ball, test VI) of greater than or equal to 70° C., where the tackifier resin component (b) contains at most 96 wt % of the tackifier resin variety.

9. The pressure-sensitive adhesive as claimed in claim 1, characterized in that
the plasticizer resin component (c) is a plasticizer resin or plasticizer resin mixture having a softening temperature (ring & ball, test VI) of <30° C.

10. The pressure-sensitive adhesive as claimed in claim 1, characterized in that
the pressure-sensitive adhesive comprises up to 10 wt % of the further additives.

11. A foamed pressure-sensitive adhesive layer, comprising
a) 41.7 wt % to 62.0 wt % of an elastomer component,
b) 37.7 wt % to 58.0 wt % of a tackifier resin component,
c) 2 wt % to 10.0 wt % of a plasticizer resin component,
d) 0 wt % to 18 wt % of further additives and
e) microballoons having a fraction of 0.3 wt % to 2.5 wt %, where the microballoons are in an at least partially expanded state,
where the elastomer component (a) comprises at least 90 wt % of polyvinylaromatic-polydiene block copolymer,
where the tackifier resin component (b) comprises 4 wt % to 40 wt % (based on the tackifier resin component) of at least one variety of a rosin oligomer having a softening temperature (ring & ball, test VI) of at least 90° C., and
where the density (test IX) of the foamed pressure-sensitive adhesive layer is at least about 650 $kg/m^3$ and at most about 870 $kg/m^3$.

12. An adhesive tape which comprises at least one pressure-sensitive adhesive layer as claimed in claim 11, where the adhesive tape is a double-sided adhesive tape.

13. The adhesive tape as claimed in claim 12, which is redetachable without residue or destruction by extensive stretching substantially in the bond plane.

14. The pressure-sensitive adhesive layer as claimed in claim 11,
characterized in that
the pressure-sensitive adhesive layer comprises 45 to 55 wt % of the elastomer component.

15. The pressure-sensitive adhesive layer as claimed in claim 11, characterized in that the pressure-sensitive adhesive layer comprises 45 to 55 wt % of the tackifier resin component.

16. The pressure-sensitive adhesive layer as claimed in claim 11, characterized in that the tackifier resin component (b) contains 5 wt % to 40 wt % of at least one variety of a rosin oligomer having a softening temperature (ring & ball, test VI) of at least 90° C.

17. An assembly wherein two substrates are bonded with the double-sided adhesive tape as claimed in claim 12.

18. A method of bonding components of mobile devices, comprising:

bonding the components with the adhesive tape as claimed in claim 12.

* * * * *